US007508983B2

United States Patent
Enomoto (10) Patent No.: US 7,508,983 B2
(45) Date of Patent: Mar. 24, 2009

(54) METHOD AND DEVICE FOR DIVIDING TARGET IMAGE, DEVICE FOR IMAGE RECOGNIZING PROCESS, PROGRAM AND STORAGE MEDIA

(75) Inventor: Mitsuhiro Enomoto, Kariya (JP)

(73) Assignee: Denso Corporation, Kariya (JP)

( * ) Notice: Subject to any disclaimer, the term of this patent is extended or adjusted under 35 U.S.C. 154(b) by 658 days.

(21) Appl. No.: 11/185,843

(22) Filed: Jul. 21, 2005

(65) Prior Publication Data

US 2006/0088213 A1 Apr. 27, 2006

(30) Foreign Application Priority Data

Oct. 27, 2004 (JP) ............................. 2004-312331

(51) Int. Cl.
G06K 9/34 (2006.01)
(52) U.S. Cl. .................. 382/173; 382/171; 382/162; 382/164; 382/190; 707/3
(58) Field of Classification Search ................ 382/171, 382/173, 162, 164, 180, 195, 199, 190, 128, 382/305; 358/538, 453, 462; 707/3
See application file for complete search history.

(56) References Cited

U.S. PATENT DOCUMENTS 6,128,407 A * 10/2000 Inoue et al. ................. 382/167

| 6,282,317 | B1 * | 8/2001 | Luo et al. .................... 382/203 |
| 6,606,408 | B1 | 8/2003 | Kang et al. |
| 2002/0090133 | A1 * | 7/2002 | Kim et al. .................... 382/164 |
| 2003/0108237 | A1 | 6/2003 | Hirata |
| 2004/0057600 | A1 | 3/2004 | Niwa |
| 2005/0004897 | A1 * | 1/2005 | Lipson et al. .................. 707/3 |

FOREIGN PATENT DOCUMENTS

| JP | A-2000-194865 | 7/2000 |
| JP | A-2002-32754 | 1/2002 |
| JP | A-2002-32763 | 1/2002 |

* cited by examiner

*Primary Examiner*—Matthew C Bella
*Assistant Examiner*—Ali Bayat
(74) *Attorney, Agent, or Firm*—Posz Law Group, PLC (57) ABSTRACT

According to a region dividing device, a region dividing member generates a plurality of primary region groups, each of which includes a plurality of primary regions. Each of the plurality of primary regions is characterized by each measured value of feature values. A basic region group generating member generates a single basic region group that includes a plurality of basic regions produced by dividing the target image. Each basic region is characterized by each measured value of feature values. Each measured value is obtained based on the measured values of the plurality of primary regions of the plurality of primary region groups. A region integrating member integrates similar adjacent basic regions into a corresponding integrated region, based on a weighted Euclidean distance between the similar adjacent basic regions.

16 Claims, 9 Drawing Sheets

| | | DETERMINATION OF LUMINOSITY | |
|---|---|---|---|
| | | BRIGHT (Th≧T1) | DARK (Th<T1) |
| DETERMINATION OF COMPLEXITY | SIMPLE (Ea≦T2) | K1-K3: COLOR  —<br>K4-K7: TEXTURE  —<br>K8, K9: MOTION  —<br>K10: DISTANCE  — | K1-K3: COLOR  ↓<br>K4-K7: TEXTURE  ↓<br>K8, K9: MOTION  ↑<br>K10: DISTANCE  ↑ |
| | COMPLEX (Ea>T2) | K1-K3: COLOR  ↑<br>K4-K7: TEXTURE  ↑<br>K8, K9: MOTION  ↓<br>K10: DISTANCE  ↓ | K1-K3: COLOR  —<br>K4-K7: TEXTURE  —<br>K8, K9: MOTION  —<br>K10: DISTANCE  — |

—: DEFAULT WEIGHT VALUE    ↓: DECREASED    ↑: INCREASED

FIG. 7A

COLOR INFORMATION

$$\begin{bmatrix} H \\ S \\ V \end{bmatrix}$$

FIG. 7B

FIRST TEXTURE INFORMATION
(LARGE REGION)

$$\begin{bmatrix} \text{FOURIER POWER} \\ \text{FOURIER ANGLE OF DEVIATION} \end{bmatrix}$$

FIG. 7C

SECOND TEXTURE INFORMATION
(SMALL REGION)

$$\begin{bmatrix} \text{FOURIER POWER} \\ \text{FOURIER ANGLE OF DEVIATION} \end{bmatrix}$$

FIG. 7D

MOTION INFORMATION $$\begin{bmatrix} \text{FLOW DIRECTION} \\ \text{FLOW NORM} \end{bmatrix}$$

FIG. 7E

DISTANCE INFORMATION $$\begin{bmatrix} \text{DISTANCE} \end{bmatrix}$$

FIG. 8A

▨ TARGET BASIC REGION

▧ OVERLAPPING REGION

← BASIC REGION GROUP
  = FIRST PRIMARY REGION GROUP

FIG. 8B

← TARGET PRIMARY REGION GROUP
  = SECOND PRIMARY REGION GROUP

FIG. 8C

← TARGET PRIMARY REGION GROUP
  = THIRD PRIMARY REGION GROUP

FIG. 8D

← TARGET PRIMARY REGION GROUP
  = FOURTH PRIMARY REGION GROUP

FIG. 8E

← TARGET PRIMARY REGION GROUP
  = FIFTH PRIMARY REGION GROUP

FIG. 9A

BEFORE
INTEGRATING PROCESS

FIG. 9B

AFTER
INTEGRATING PROCESS

METHOD AND DEVICE FOR DIVIDING TARGET IMAGE, DEVICE FOR IMAGE RECOGNIZING PROCESS, PROGRAM AND STORAGE MEDIA

CROSS REFERENCE TO RELATED APPLICATION

This application is based on and incorporates herein by reference Japanese Patent Application No. 2004-312331 filed on Oct. 27, 2004.

BACKGROUND OF THE INVENTION

1. Field of the Invention

The present invention relates to a region dividing (or segmenting) method and device for extracting a region, which is a recognizing target in the image, and relates to an image recognizing process device, which is equipped with the region dividing device.

2. Description of Related Art

Conventionally, a region dividing process has been performed so as to serve as an art for extracting such recognizing targets, as "sky", "ground", "forest" and "human beings", in an image.

An accuracy of a region, which is extracted by the region dividing process, has a considerable influence on results of a code processing and a recognizing/extracting processing in later processes. Therefore, the accuracy of the region dividing process needs to be improved.

In a general region dividing method, at first, feature values of information categories (e.g., color information and texture information), which are extracted from target image that is targeted for processing, are used to divide the target image into small regions. Then, adjacent regions, which are similar to each other, are integrated together one by one (see Japan Unexamined Patent Publications No. 2002-32763 and No. 2003-173442, corresponding to US2003/0108237A1).

However, measured values of feature values, which are obtained from the target image, are deteriorated by various noises that exist in the target image. Thus, the deteriorated measured values sometimes cause difficulties, such as an inaccurate extraction of a region.

For example, because of influences of a reflection image of circumstances that is seen on a surface of asphalt in an image of rainy scenery, a change of an object shape due to a backlight, and an existence of shadow, a region of a target object that in reality does not exist is sometimes extracted by mistake. Also, there is a case, where a certain region in a target image shows a uniformed color, although, in reality, different objects are overlapping each other in the region. In this case, there is no difference among the feature values that characterize the regions of each target object. Thus, there is a difficulty in dividing the uniformed color region into each accurate region of target objects.

In order to deal with these difficulties, a device is disclosed (see Japanese Unexamined Patent Publication No. 2002-32754). The device obtains detected data, which are detected by a plurality of sensors (an infrared camera, a visible light camera and a millimetric-wave radar). The detected data are described as input images. Then, the input images are weighed according to circumstance conditions, and a single target image is generated by merging the weighted input images. The recognizing process is performed with the single target image.

However, the device described in Japanese Unexamine Patent Publication No. 2002-32754 recites a need of performing weighted sum of every pixel at time of integrating a plurality of image data. Thus, there is a problem of increased processing load.

Also, each spatial resolution of each sensor output rarely coincides with each other. Thus, there is difficulty in directly incorporating each set of sensor output information into a pixel of the image.

SUMMARY OF THE INVENTION

The present invention addresses the above disadvantages. Thus, it is an objective to the present invention to provide a region dividing method and device, which is resistible to the influence of noises of a target image, to provide an image recognizing process device, which utilizes the region dividing device, to provide a program for operating a computer, and to provide a computer readable storage media.

To achieve the objective of the present invention, there is provided a region dividing method of a target image. According to the method, a plurality of primary region groups, each of which includes a plurality of primary regions, are generated. The plurality of primary regions is produced in such a manner that each primary region of the primary region group is characterized by a measured value of at least one common corresponding feature value. Here, the at least one common corresponding feature value is common to the plurality of primary regions of the primary region group. A single basic region group that includes a plurality of basic regions, which are produced by dividing the target image, is generated. Here each basic region has the measured value of the at least one corresponding feature value of each overlapping one of the plurality of primary regions of each primary region group, which overlaps with the basic region, so that each basic region has the measured values of the feature values of the overlapping primary regions of the plurality of primary region groups, which overlap with the basic region. Similar adjacent ones of the plurality of basic regions are integrated into a corresponding integrated region, in a case, where a similarity of the similar adjacent ones of the plurality of basic regions satisfies a predetermined similarity with respect to the measured values of the feature values of the similar adjacent ones of the plurality of basic regions.

To achieve the objective of the present invention, there is also provided a region dividing device of a target image, which includes a region dividing means. The region dividing means generates a plurality of primary region groups, each of which includes a plurality of primary regions. The plurality of primary regions are produced by dividing the target image in such a manner that each primary region of the primary region group is characterized by a measured value of at least one common corresponding feature value. Here the at least one common corresponding feature value is common to the plurality of primary regions of the primary region group. Also, the region dividing device of the target image includes a basic region generating means. The basic region generating means generates a single basic region group that includes a plurality of basic regions, which are produced by dividing the target image. Here, each basic region has the measured value of the at least one corresponding feature value of each overlapping one of the plurality of primary regions of each primary region group, which overlaps with the basic region, so that each basic region has the measured values of the feature values of the overlapping primary regions of the plurality of primary region groups, which overlap with the basic region. The region dividing device of the target image includes a region integrating means. The region integrating means integrates similar adjacent ones of the plurality of basic regions into a corresponding integrated region in a case, where a similarity of the similar adjacent ones of the plurality of basic regions satisfies a predetermined similarity with respect to the measured values of the feature values of the similar adjacent ones of the plurality of basic regions.

To achieve the objective of the present invention, there is also provided an image recognizing process device. The image recognizing process device includes a region extracting means for extracting a region, and the region extracting means includes the region dividing device. Also, the image recognizing process device includes a recognizing means for recognizing each target object, and each target object is described by each extracted region, which is extracted by the region extracting means.

To achieve the objective of the present invention, there is also provided a program for operating a computer. The program includes processes, each of which is implemented by each corresponding means of the region dividing device.

To achieve the objective of the present invention, there is also provided a computer readable storage media. The storage media includes the above described program.

BRIEF DESCRIPTION OF THE DRAWINGS

The invention together with additional objectives, features and advantages thereof, will be best understood from the following description, the appended claims and the accompanying drawings in which:

DETAILED DESCRIPTION OF THE INVENTION

In first and second embodiments, following rules are applied:

feature values include hue of a color, saturation of a color, value of a color, a power, an angle of deviation, a flow direction, a flow norm, a distance to a target object and the like; and feature values compose corresponding information categories, such as color information, first texture information, second texture information, motion information, distance information and the like.

FIRST EMBODIMENT

A first embodiment of the present invention will be described with reference to the accompanying drawings.

Figure 1:
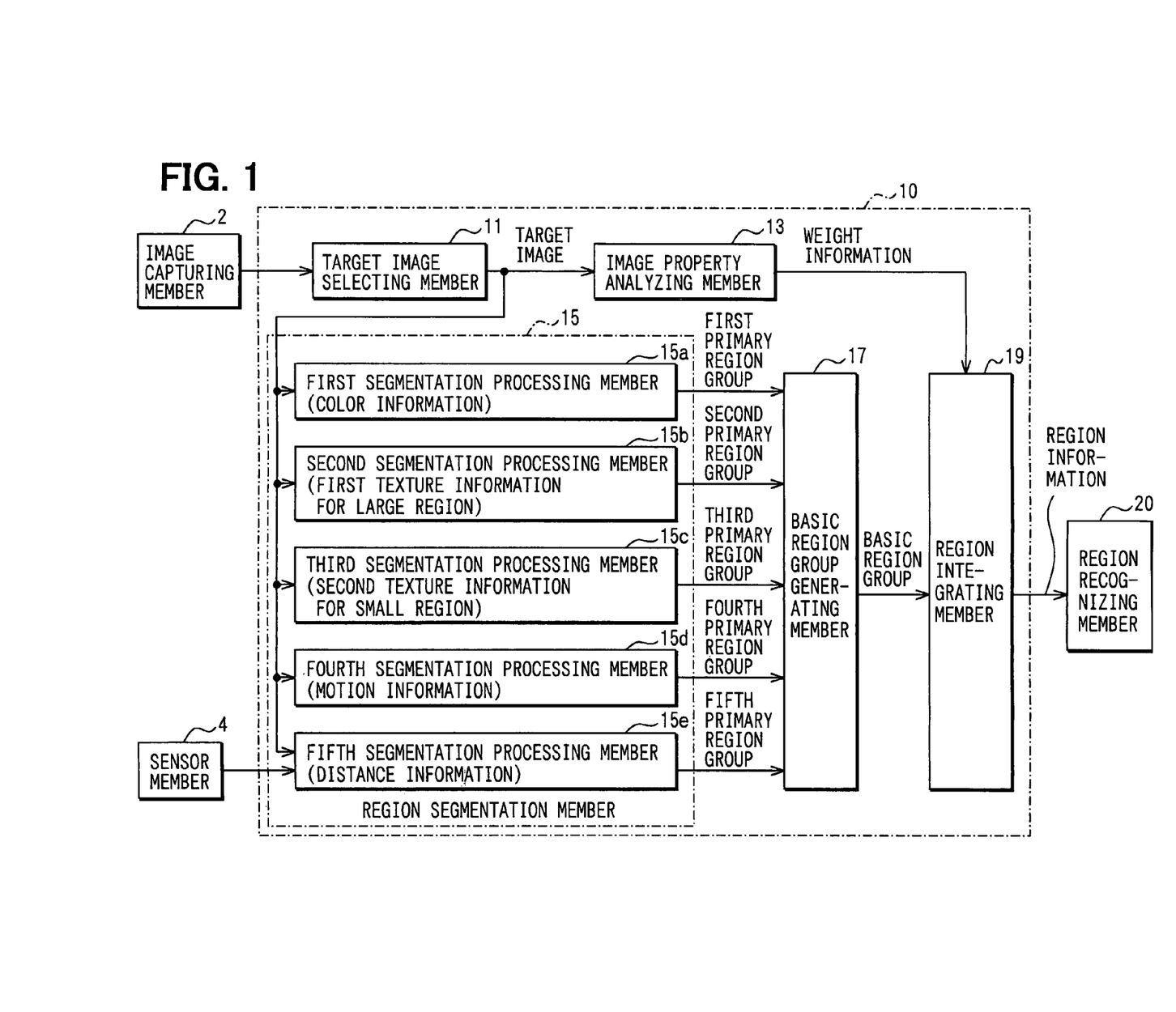
FIG. 1 is a block diagram of a general structure of an image recognizing process device.

FIG. 1 is a block diagram of a general structure of an image recognizing process device of the present embodiment.

The image recognizing process device includes an image capturing member 2, a sensor member 4, a region extracting member 10 and a region recognizing member 20. The sensor member 4, which includes a laser radar, measures a distance to each target object existing in a detecting region, which is the same region as a captured region of the image capturing member 2. The region extracting member 10 receives input images from the image capturing member 2 and detected data from the sensor member 4, and divides the input images into a plurality of regions. Then, the region extracting member 10 extracts a recognizing target region from the plurality of regions. The region recognizing member 20 recognizes the target object, which is described by the recognizing target region that the region extracting member 10 extracts.

The region extracting member 10 includes a target selecting member 11, an image property analyzing member 13, a region dividing member 15, a basic region group generating member 17 and a region integrating member 19. The target selecting member 11 selects a target image from a whole or a part of the input images, which are captured by the image capturing member 2. The image property analyzing member 13 analyzes general properties of the target image, which is selected by the target selecting member 11. Then, by use of analysis results, the image property analyzing member 13 sets up weight information, which is used by the region integrating member 19. The region dividing member 15 includes first to fifth segmentation processing members 15a to 15e, each of which generates first to fifth primary region groups, respectively. Each of the first to fifth primary region groups includes a plurality of primary regions, which are produced by dividing the target image that is selected by the target selecting member 11. The target image is divided in such a manner that each primary region of each of the first to fifth primary region groups is characterized by a measured value of at least one common corresponding feature value, in a condition where the at least one common corresponding feature value is common to the plurality of primary regions of each of the first to fifth primary region groups. The basic region group generating member 17 generates a single basic region group based on the first to fifth primary region groups. The region integrating member 19 integrates similar adjacent basic regions of the basic region group, which is generated by the basic region group generating member 17, into a corresponding integrated region based on the weight information, which is set up by the image property analyzing member 13.

Figure 7A:
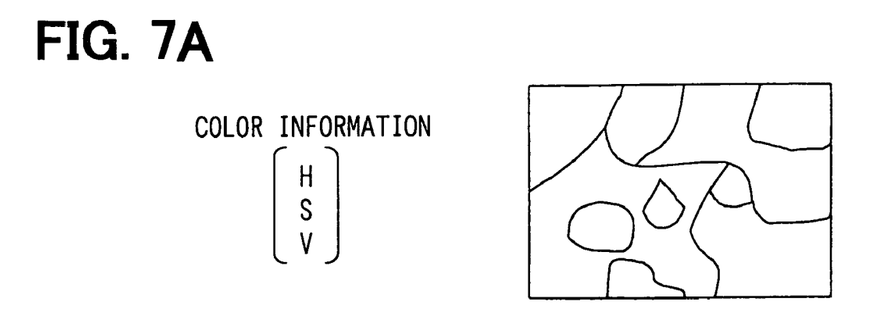
FIGS. 7A to 7E are images of feature values, which are utilized/formed in segmentation processing members, and primary regions, which are generated by a region segmentation process.

The first segmentation processing member 15a, which is one of the first to fifth segmentation processing members 15a to 15e of the region dividing member 15, is designed to perform a region dividing process based on measured values of feature values of color information, which includes H (hue), S (saturation) and V (value) for indicating a color of a pixel. Each region, which is divided by the first segmentation processing member 15a, is a primary region. Primary regions form various shapes as shown in FIG. 7A. From here, the color information of H, S and V will be indicated as feature values $fea_1$, $fea_2$ and $fea_3$.

Known region dividing algorithms, such as a region growing method, a merge sort algorithm, watershed method, and a blob image generation, may be used for the region dividing process. However, the region dividing method is not limited for the above described method. Thus, other region dividing algorithms may be alternatively used for the region dividing process. Also, variables, such as color systems except HSV or RGB that indicates three primary colors, may be alternatively used as feature values for the color information. Further, converted variables, which are obtained by converting the above described variables with selected polynomial formulas, may also be used as the feature value for the color information.

The second segmentation processing member 15b generates fixed-size primary regions by dividing the target image into quarters. The third segmentation processing member 15c generates fixed-size primary regions by dividing the target image into 16 equal regions (see FIGS. 7B and 7C). Then, the second segmentation processing member 15b calculates first texture information through converting regularity of corresponding primary region into numbers. Each calculated first information is used as a feature value of corresponding primary region. The third segmentation processing member 15c calculates second texture information through converting regularity of corresponding primary region into numbers. Each calculated second information is used as a feature value of corresponding primary region. Here, a size and a form of the primary region are not limited to 4 or 16 equal-sized rectangles. Thus, a size and a form of each primary region may be predetermined in any ways.

Figure 7B:
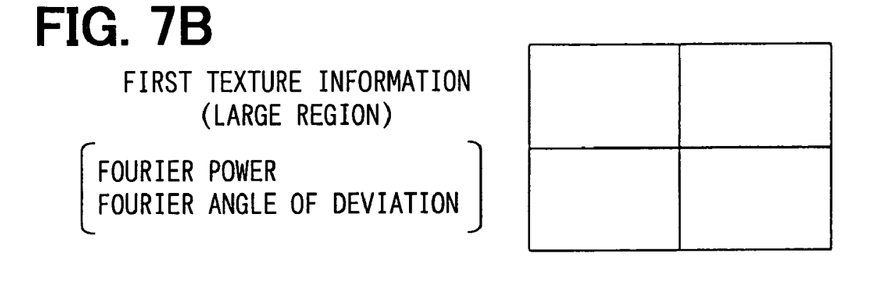
Figure 7C:
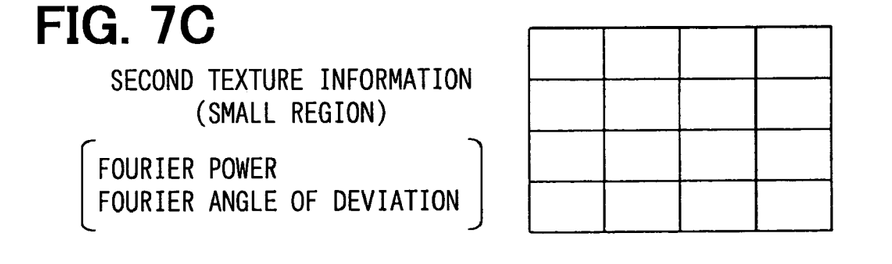

In computation of the texture information, various known frequency analysis methods (e.g., DCT, FET and Gabor Filter) and histogram statistics (e.g., variance, entropy and power) may be used. In the first embodiment, two dimensional FET is used and each feature value of the texture information is expressed in a power and an angle of deviation. From here, a first power and a first angle of deviation, which are calculated by the second segmentation processing member 15b, of the first texture information will be expressed as feature values $fea_4$ and $fea_5$. A second power and a second angle of deviation, which are calculated by the third segmentation processing member 15c, of the second texture information will be indicated as feature values $fea_6$ and $fea_7$.

Figure 7D:
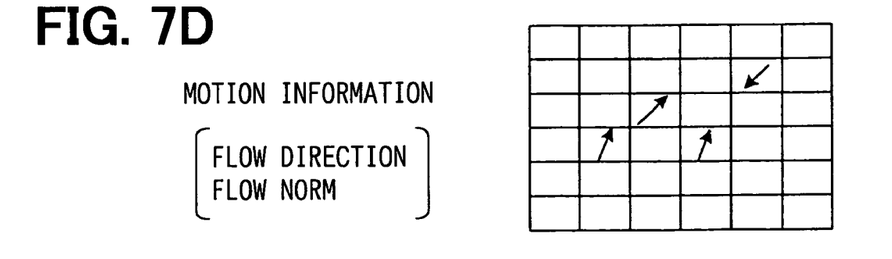

The fourth segmentation processing member 15d generates fixed-size primary regions by dividing the target image into 36 equal regions (see FIG. 7D). The fourth segmentation processing member 15d calculates motion information, which includes a flow direction and a flow norm, of target objects that are indicated within each primary region. Each variable of the motion information is used as a feature value of corresponding primary region. A size and a form of the primary region are not limited to 36 equal-sized rectangles. A size and a form of each primary region may be predetermined in any ways.

According to the calculation of the motion information, various known motion analysis methods (e.g., an optical flow, an inter-frame difference and a background difference) may be used. From here, the flow direction and the flow norm of the motion information will be indicated as the feature values $fea_8$ and $fea_9$.

Figure 7E:
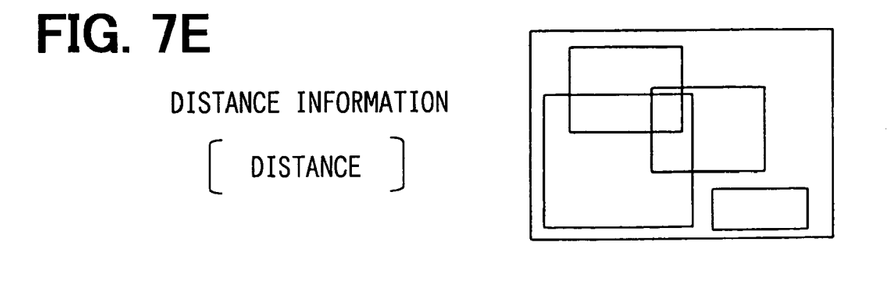

The fifth segmentation processing member 15e divides the target image into regions by use of measured values of the feature value, which is a distance between the sensor member 4 and the target objects to be detected, and composes the distance information. Each region, which is divided by the above-described region dividing process, is a primary region. Each primary region is formed as circumscribing rectangle as shown in FIG. 7E, so that each primary region may overlap other primary regions. From here, the distance variable, which is included in the distance information, will be used as a feature value $fea_{10}$.

According to the method for the region dividing process by the fifth segmentation processing member 15e, any region dividing algorithm may be used as is the case with the first segmentation processing member 15a. Also, the sensor member 4, which supplies the distance information, may includes not only the laser radar, but also a millimetric-wave radar, a sensor that generates a range image, a processor that process stereo images taken by multiple image capturing devices, and the like.

The region extracting member 10 and the region recognizing member 20 are realized as a process performed by known computers that is composed by mainly CPU, ROM and RAM.

A process of the region extracting member 10 will be described with reference to flow diagrams as shown in FIGS. 2 to 5.

Figure 2:
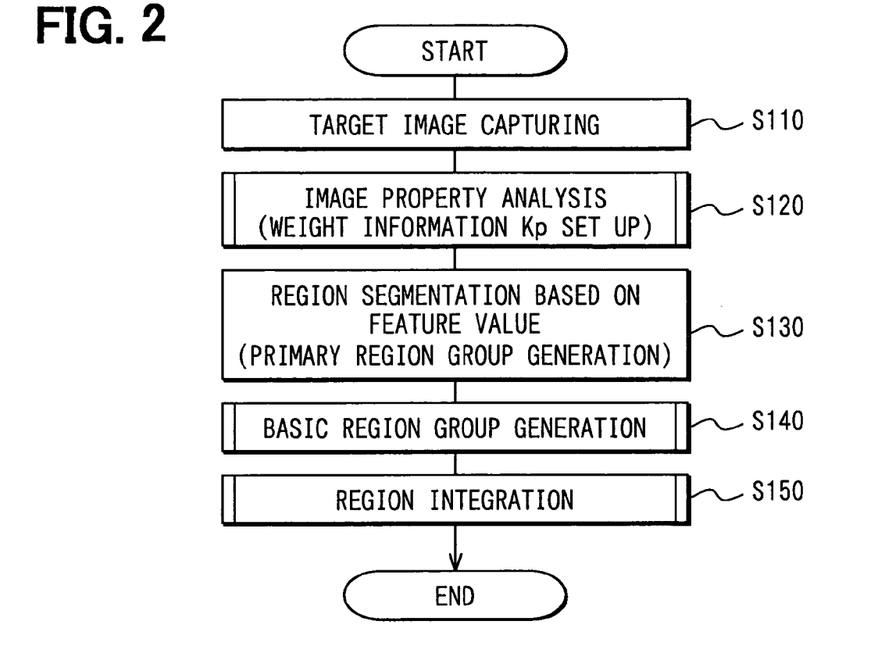
FIG. 2 is a flow chart of region extracting process.

As shown in FIG. 2, at S110, a process of the region extracting member in starts with the operation of the target image selecting member 11, which selects the target image from a whole or a part of the input images that are captured by the image capturing member 2. At S120, the process performs the operation of the image property analyzing member 13, which analyzes general properties of a whole image of the selected target image and sets up the weight information, which is used by the later-described region integrating process. From here, the operation by the image property analyzing member 13 will be described as an "image property analyzing process".

Figure 3:
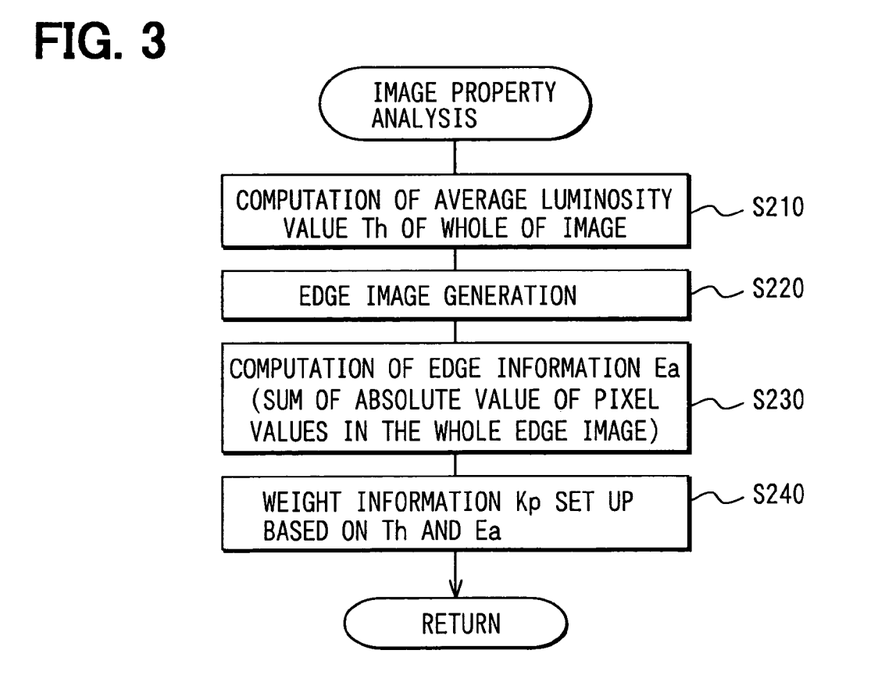
FIG. 3 is a flow chart of an image property analyzing process.

At S210, the image property analyzing process, as shown in FIG. 3, calculates an average luminosity value Th of the whole image of the target image. Thereafter, at S220, the process generates an edge image by calculating a difference between the target image of this time (current target image) and the target image of last time (previous target image). Then, at S230, the process calculates a sum of absolute values of pixel values in the whole edge image. The sum of absolute values of the pixel values is indicated as an edge information Ea. The average luminosity value Th is expressed by formula (1), and the edge information Ea is expressed by the formula (2), in a case, where the luminosity value of the target image is indicated as f(i, j).

$$Th = \frac{\sum_i \sum_j f(i, j)}{i \times j} \tag{1}$$

$$Ea = \sum_i \sum_j \frac{d}{dt} f(i, j) \tag{2}$$

At S240, by use of the average luminosity value Th and the edge information Ea, each of which is calculated by the corresponding above described formula, the process sets up each weight information $K_P$ (P=1 to 10) that corresponds to each feature value $fea_P$ (P=1 to 10). Then, the process is finished.

A specific way for setting the weight information $K_1$ to $K_{10}$ will be described. First, the average luminosity value Th is compared with a predetermined threshold value T1 in order to classify luminosity of the target image into two categories of bright and dark. At the same time, the edge information Ea is compared with a predetermined threshold value T2 in order to classify complexity of the target image into two categories of simple and complex. Then, the weight information $K_1$ to $K_{10}$ are determined based on a table shown in FIG. 6.

Figure 6:
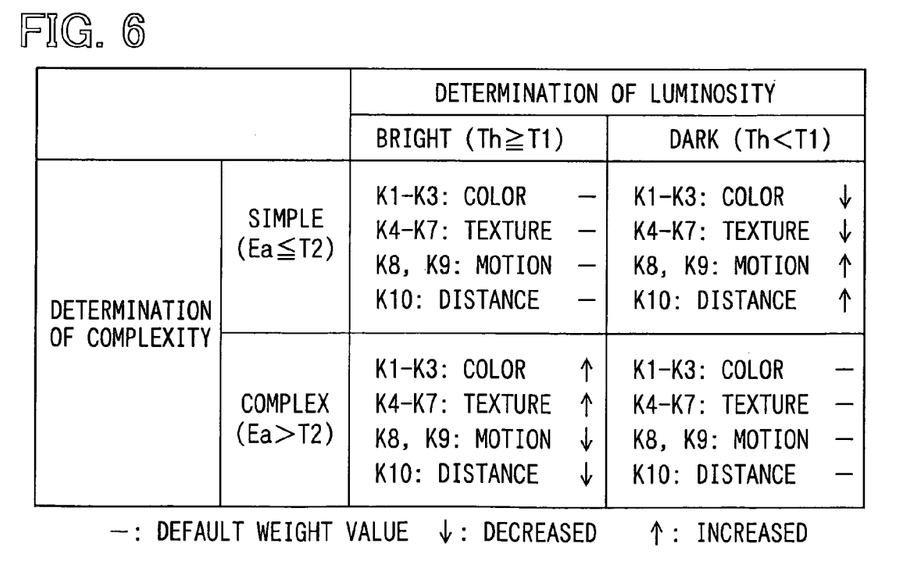
FIG. 6 is a view of contents of a table for determining weight information.

Thus, in a case, where the luminosity is determined as bright (Th≧T1) and the complexity is determined as simple (Ea≦T2), each weight information $K_1$ to $K_{10}$ is set as each corresponding prepared default weight value. Also, in a case, where the luminosity is determined as dark (Th<T1) and the complexity is determined as complex (Ea>T2), each weight information $K_1$ to $K_{10}$ set as each corresponding prepared default weight value. In a case, where the luminosity is determined as bright (Th≧T1) and the complexity is determined as complex (Ea>T2), each weight information $K_1$ to $K_3$ for the color information and each weight information $K_4$ to $K_7$ for the texture information becomes increased. At the same time, each weight information $K_8$ and $K_9$ for the motion information and the weight information $K_{10}$ for the distance information become decreased. In contrast. in a case, where the luminosity is determined as dark (Th<T1) and the complexity is determined as simple (Ea≦T2), each weight information $K_1$ to $K_3$ for the color information and each weight information $K_4$ to $K_7$ for the texture information becomes decreased. At the same time, each weight information $K_8$ and $K_9$ for the motion information and the weight information $K_{10}$ for the distance information become increased.

In the first embodiment, the luminosity is classified into two corresponding categories, and the complexity is classified into two corresponding categories. However, alternatively, the luminosity is classified into three or more corresponding categories, and the complexity is also classified into three or more corresponding categories. Also, by use of a formula with parameters of the average luminosity value Th and the edge information Ea, each weight information $K_1$ to $K_{10}$ may be calculated. Also the weight information $K_1$ to $K_{10}$ may be determined based on a property other than the luminosity and the complexity, if the property represents the general properties of the target image.

At S130, as shown in FIG. 2, the process of the region segmentation member 15, which operates each region dividing process based on each of feature values, is performed to the target image, which is selected at S110, based on feature values of the five categories (the color information, the first texture information for large region, the second texture information for small region, the motion information and the distance information). Then, the first to fifth primary region groups are generated. From here, this process will be described as a "region segmentation process".

At S140, the process of the basic region group generating member 17 is performed to generate the single basic region group, which is used in a later described region integration, based on the first to fifth primary region groups that are generated at S130. From here, this process will be described as a "basic region group generating process".

Figure 4:
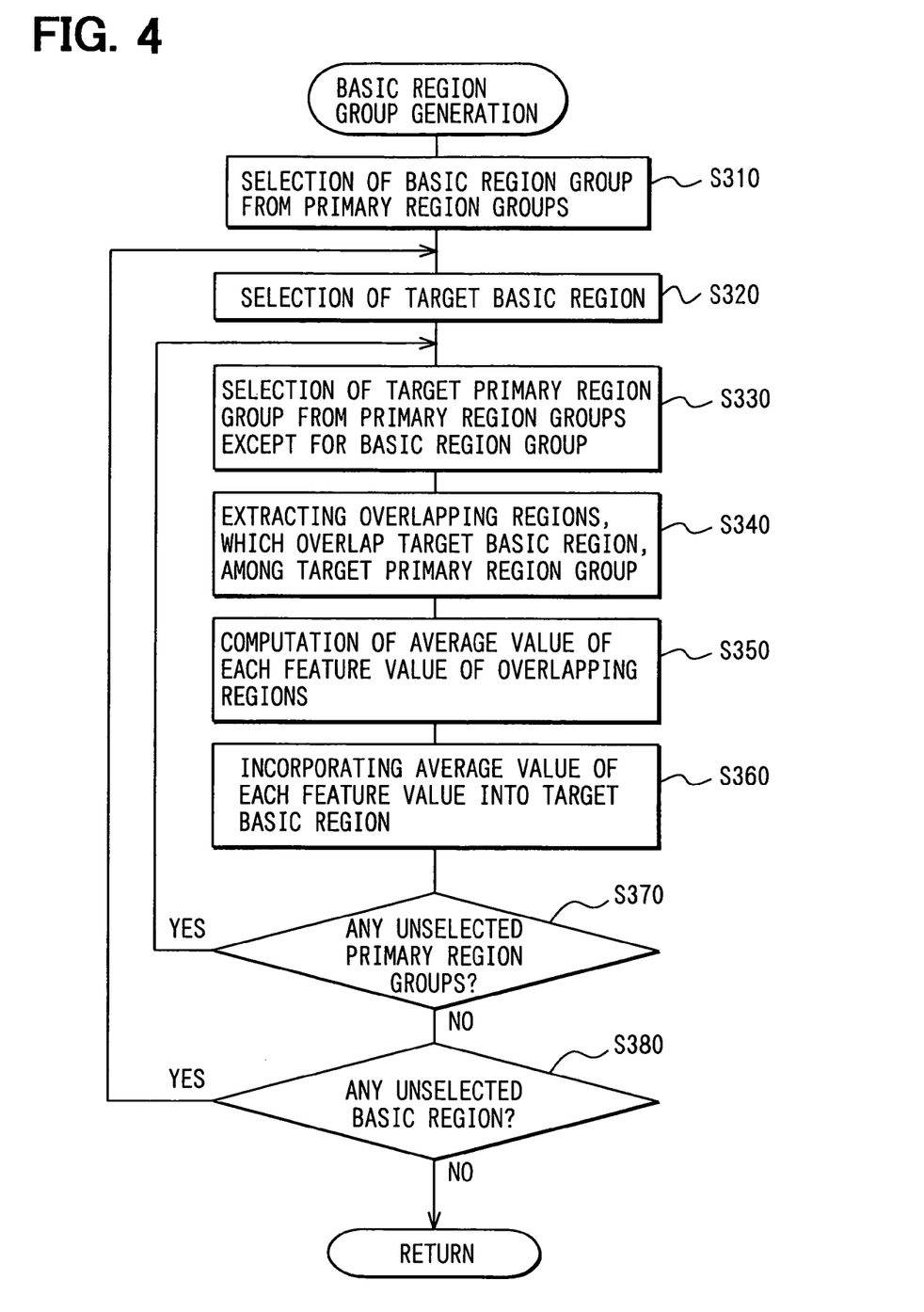
FIG. 4 is a flow chart of a basic region group generating process.

In the basic region group generating process, as shown in FIG. 4, at S310, a satisfactory primary region group of the first to fifth primary region groups is selected as the basic region group, if the satisfactory primary region group satisfies a predetermined condition. The predetermined condition is that a number of primary regions (divided regions) in the satisfactory primary region group is more than a predetermined number of regions. Also, the predetermined condition may be that a variability in seize of regions in the satisfactory primary region group is small.

Then, at S320, one of the basic regions that compose the basic region group is selected as a target basic region. At the same time, one of the primary region groups except the basic region group is selected as a target primary region group.

A method for selecting the target basic region in turns may be a selection by scanning from the top, a selection at random, a selection in an order of smallness (or, largeness) of each region area, and the like.

If a primary region in the target primary region group overlaps a whole or a part of the target basic region, the primary region is selected and named as an "overlapping region". All selected overlapping regions are defined computation target regions. Then, at S350, an average value of each feature value of the computation target regions is calculated. Then, at S360, the average values of the feature values are incorporated into the feature values of the target basic region.

At S370, it is determined if any primary region group, which is one of the primary region groups except the basic region group, remains without being selected as the target primary region group. If there is any generated group that is not selected as the target primary region group, processes S330 to S360 are performed on the unselected primary region group.

In contrast, in a case, where there is no unselected primary region group, at S380, it is determined if any basic region remains without being selected as the target basic region. If there is an unselected basic region, processes of S320 to S370 are performed to the unselected basic region. When every basic region is selected as the target basic region, the present process is finished.

Figure 8A:
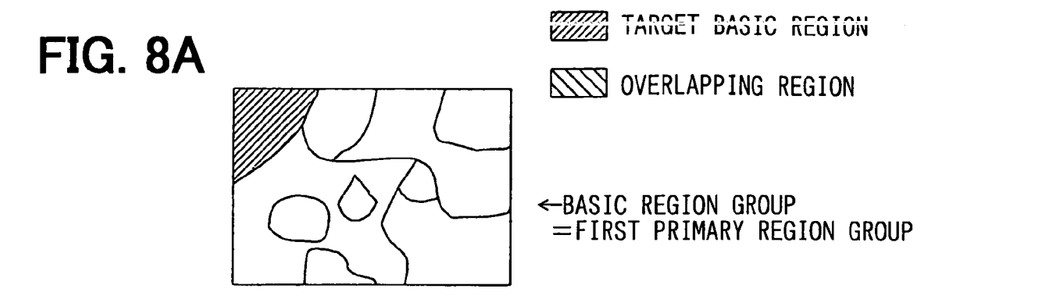
FIGS. 8A to 8E are views of each physical relationship between a target basic region and each overlapping region.
Figure 8B:
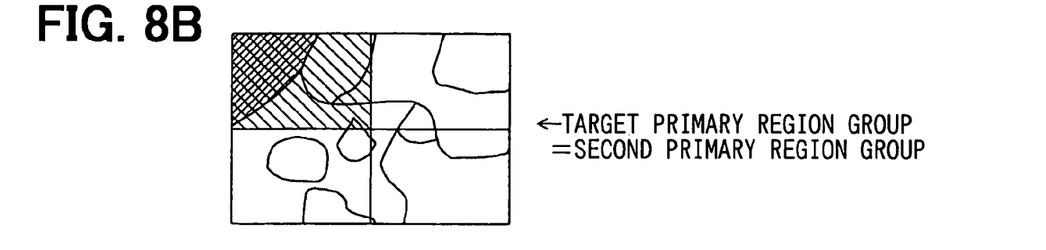
Figure 8C:
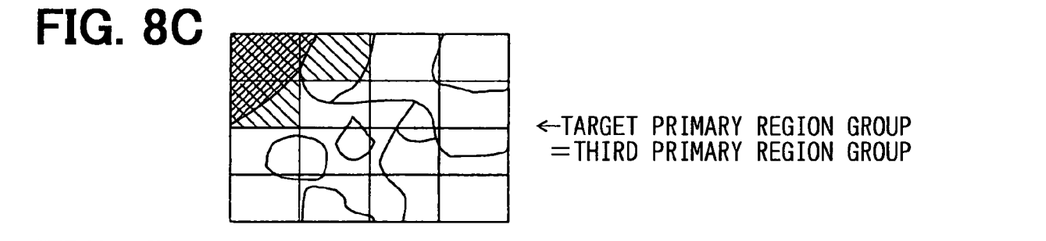
Figure 8D:
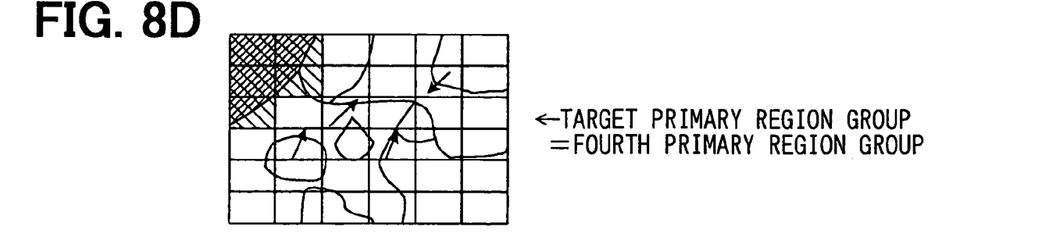
Figure 8E:
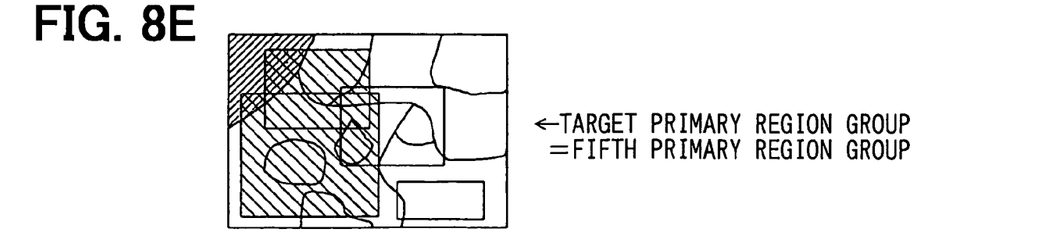

The basic region group generating process will be specifically described. For example, the first primary region group is selected as the basic region group and a left-leaning shaded region in FIG. 8A is selected as the target basic region. In this case, right-leaning regions in FIGS. 8B to 8E are determined as overlapping regions (or computation target regions) of the second to the fifth primary region groups.

The basic region group is composed of each basic region $R_k$, where k is a variable for recognizing each basic region. Each basic region $R_k$ is characterized by five-categorized 10 feature values $fea_1(R_k)$ to $fea_{10}(R_k)$, as shown by a formula (3).

$$Rk = \begin{bmatrix} \begin{bmatrix} H \\ S \\ V \end{bmatrix} \\ \begin{bmatrix} \text{Fourier Power} \\ \text{Fourier Angle of Deviation} \end{bmatrix} \\ \begin{bmatrix} \text{Fourier Power} \\ \text{Fourier Angle of Deviation} \end{bmatrix} \\ \begin{bmatrix} \text{Flow Direction} \\ \text{Flow Norm} \end{bmatrix} \\ [\text{Distance}] \end{bmatrix} = \begin{bmatrix} fea_1(R_k) \\ fea_2(R_k) \\ fea_3(R_k) \\ \vdots \\ \vdots \\ fea_n(R_k) \end{bmatrix} \quad (3)$$

$(n = 10)$

At S140, as shown in FIG. 2, the basic region group is generated. At S150, a process of the region integrating member 19 is performed to integrate each basic region $R_k$ that composes the basic region group, by use of the weight information $K_p$ that is set up at S120. Then, the process is finished. From here, the process will be described as a "region integrating process."

Figure 5:
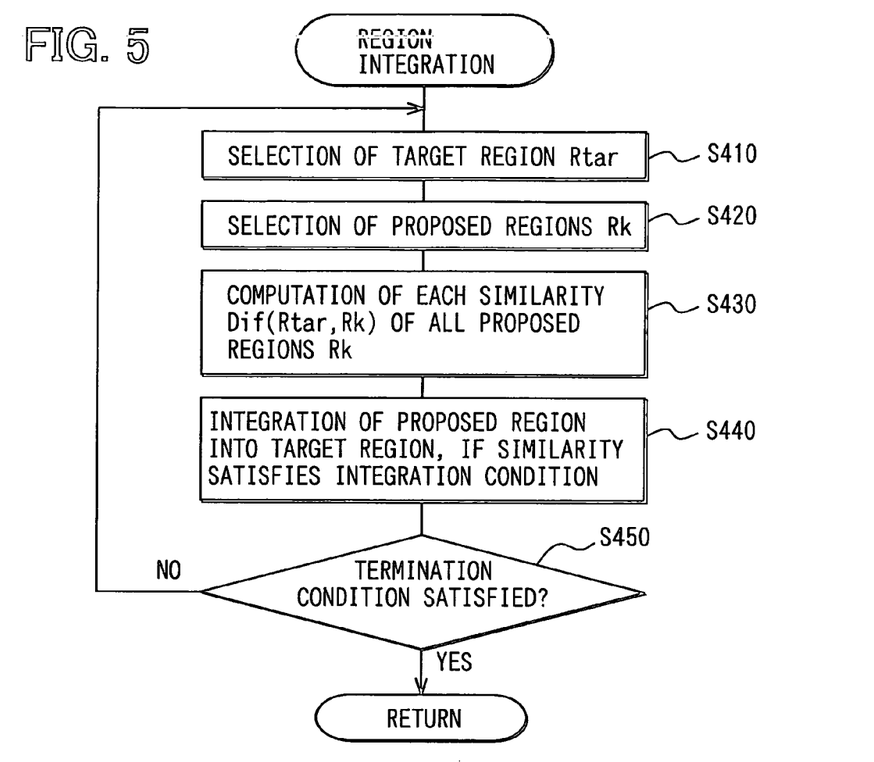
FIG. 5 is a flow chart of a region integrating process.

In the region integrating process, at S410, as shown in FIG. 5, one of the basic regions $R_k$, which composes the basic region group, is selected as a target region $R_{tar}$. Then, all adjacent basic regions of the target region $R_{tar}$ are selected as proposed regions $R_k$, where k is a variable for recognizing each proposed region $R_k$.

A distance $\text{Dif}(R_{tar}, R_k)$ on a 10-dimensional space, which is characterized by feature values of the basic regions, is used as an indication for a similarity between each proposed region $R_k$ and the target region $R_{tar}$. $Dif(R_{tar}, R_k)$ is calculated by a formula (4).

$$Dif(R_{tar}, R_k) = \left[\sum_{P=1}^{n} K_P\{fea_P(R_{tar}) - fea_P(R_k)\}^2\right]^{1/2} \quad (4)$$

According to the formula, the similarity is more significant as the distance $Dif(R_{tar}, R_k)$ becomes smaller.

At S440, a satisfactory proposed region $R_k$ is integrated together with the target region $R_{tar}$, when the satisfactory proposed region $R_k$ satisfies a predetermined condition. The predetermined condition is that the distance $Dif(R_{tar}, R_k)$ of the satisfactory proposed region $R_k$ is a smallest, in short, the similarity is a most significant, among all $Dif(R_{tar}, R_k)$s of other proposed basic regions (see a formula (5)).

$$\min\{Dif(R_{tar}, R_1), Dif(R_{tar}, R_2), \ldots, Dif(R_{tar}, R_m)\} \quad (5)$$

At S450, it is determined if a condition of the basic region group, which are integrated, satisfies a predetermined termination condition. If not, processes of S410 to S440 are performed. Otherwise, the region integrating process is finished.

The termination condition is satisfied in a case, where each area of every basic region, which composes the basic region group that is integrated, equals or exceeds a predetermined goal region area threshold.

Figure 9A:
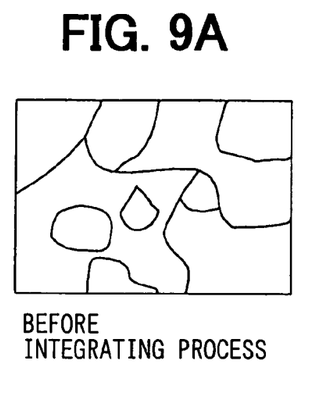
FIGS. 9A and 9B are views of basic region groups of before/after a region integrating process.
Figure 9B:
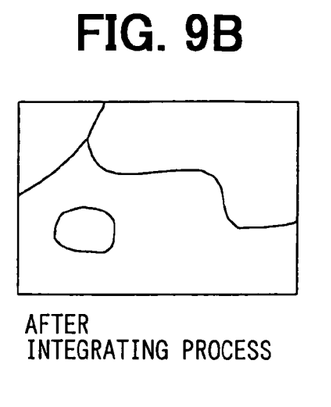

FIG. 9A is the basic region group before the region integrating process is performed. FIG. 9B is the basic region group after the region integrating process is performed.

The basic region group, which is integrated in the above-described process, serves as an output region group and is supplied to the region recognizing member 20. Then, the region recognizing member 20 recognizes the target object, which is described by each output region that composes the output region group, based on a size, a form and feature values of each output region.

As described above, according to the image recognizing process device of the present embodiment, at a time of generating a single basic region group from the plurality of primary region groups, the feature value of each primary region is used for processing, instead of the feature value of each pixel. Thus, at a time, when feature values are incorporated into the basic regions, only a small processing load is needed.

Also, in the present embodiment, the basic regions are generated so that the basic regions are characterized by the plurality of feature values. Then, the similarity among the basic regions are evaluated by the distances $Dif(R_{tar}, R_k)$s, which are calculated based on the plurality of feature values, in the process of integrating the basic regions. Thus, influences by various noises can be limited and a highly accurate region dividing process can be always achieved.

Some feature values, which are included in the color information, the texture information and the motion information, are based on the target image captured by the image capturing member 2. Also, the feature value, which is included in the distance information, is based on the detected data taken from the sensor member 4 that is separated from the capturing member 2. The feature value, which is based on the detected data, has a small possibility for being influenced by noses that influence other feature values that are based on the target image. Thus, the influences of the noises are restrained more effectively so that an accuracy of the region dividing process can be improved.

In the present embodiment, the weight information, which corresponds to each feature values and is used in case of calculating the distance $Dif(R_{tar}, R_k)$, is changeable according to general conditions, which are explained based on the general properties (e.g., luminosity and complexity) of the target image. Thus, a large impact of image capturing conditions, which impacts on the accuracy of the region dividing process, is limited so that a highly accurate region dividing process is realized stably.

According to the present embodiment, in case of calculating the average values, which are incorporated into the target basic region, of each feature value of overlapping regions, all the overlapping regions are defined as the computation target regions. However, the computation target region may be limited to overlapping regions, which satisfy a following condition. The condition is that as shown in FIG. 10C, a distance (a center distance) between a center of the overlapping region and a center of the target basic region is shorter than a predetermined distance threshold THr. In this case, the computation target regions are described as bold lined regions in FIG. 10C. Another conditions is that as shown in FIG. 10D, a proportion (area proportion) of the overlapping area between the overlapping region and the target basic region is larger than a predetermined area proportion threshold THs. In this case, the computation target regions are described as bold lined regions in FIG. 10D.

Figure 10A:
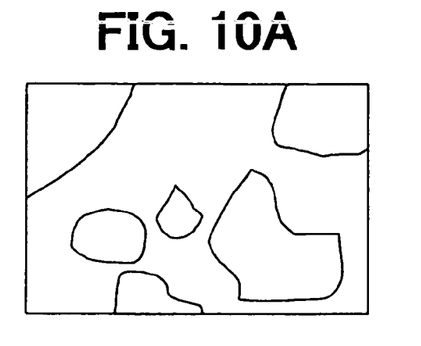
FIGS. 10A to 10F are views of alternative computation methods of feature values, which are incorporated into the target basic region.
Figure 10B:
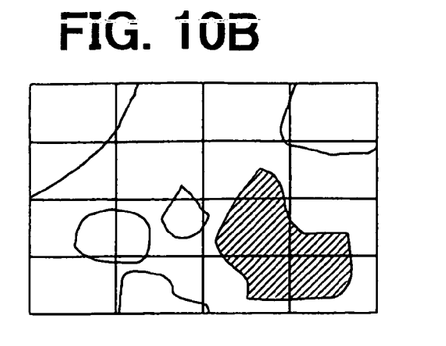
Figure 10C:
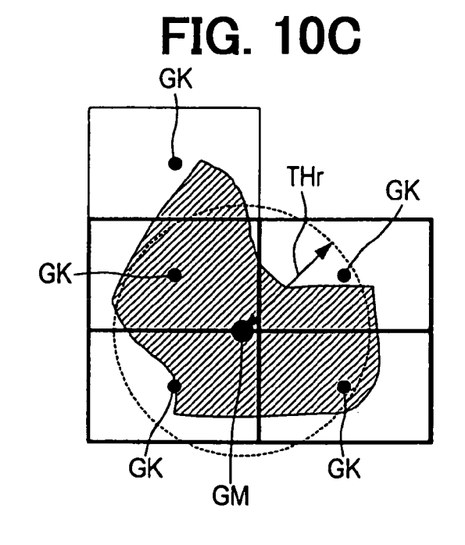
Figure 10D:
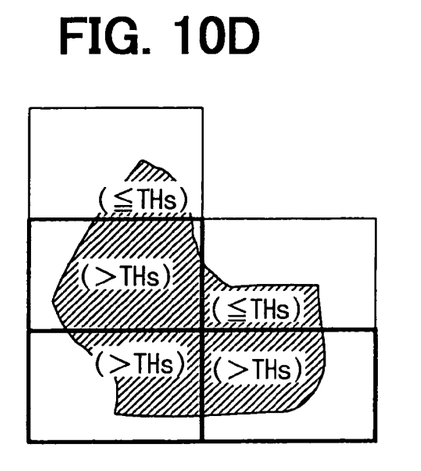

FIG. 10A is a view of the target basic region group. FIG. 10B is a view of overlapped image between the target basic region group and the target primary region group. FIGS. 10C to 10F are enlarged views of the target basic region and the overlapping regions, in a case, where a shaded region is selected as the target basic region as shown in FIG. 10B.

In the present embodiment, average values of each feature value in the overlapping regions are simply incorporated into the feature values of the tar et basic region. However, weighted average values of each feature value, which are calculated based on the weight that corresponds to each overlapping region according to a relationship between each overlapping region and the target basic region, may be alternatively incorporated into the feature values of the target basic region.

Figure 10E:
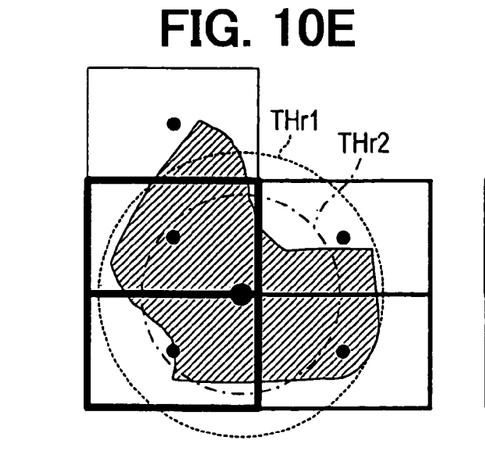
Figure 10F:
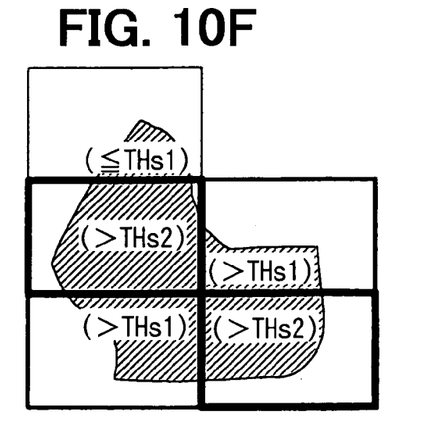

In this case, each overlapping region may be weighed according to the center distance. Then, as shown in FIG. 10E, the weight of each overlapping region is expressed with a three-stage thickness of boundary line. Also, each overlapping region may be weighed according to the area proportion. Then, as shown in FIG. 10F, weight of each overlapping region is expressed with a three-staged thickness of boundary line.

At a time, when selecting the computation target region based on the center distance and the area proportion, the selected computation target region may be weighed according to the center distance and the area proportion.

In the present embodiment, in a case, where the distance $Dif(R_{tar}, R_k)$ between the target region $R_{tar}$ and a certain adjacent region $R_k$, which is adjacent to the target region $R_{tar}$, is a shortest among all adjacent regions, the certain adjacent region $R_k$ and the target region $R_{tar}$ are integrated together. However, the integrating condition may be a condition, where the distance $Dif(R_{tar}, R_k)$ is shorter than a predetermined distance threshold T3.

In the present embodiment, weighted Euclidean distance $Dif(R_{tar}, R_k)$ is used to indicate the similarity. However, alternatively by use of stochastic methods, such as a nonlinear distance (a maximum and a minimum of each weighted element distance), GMM (Gaussian Mixture Model), HMM (Hidden Markov Model). GMRF (Gaussian Markov Random Field), and the like, regions can be described. Then, by comparing each model, the similarity of the regions can be calculated.

In the present embodiment, just a single sensor member 4 is equipped. However, a plurality of sensor members 4 may be equipped so that a number of feature values, which are based on detected data not on the target image, is two or more.

In the present embodiment, the region segmentation member 15 and S130 corresponds to a first step (the region dividing means), the basic region generating member 17 and S140 correspond to a second step (the basic region generating means), the region integrating member 19 and S150 correspond to a third step (the region integrating means), and the image property analyzing member 13 and S120 correspond to the weight information setting means.

SECOND EMBODIMENT

A second embodiment will be described.

In the present embodiment, contents of only the basic region group generating process are different from the first embodiment. Thus, the basic region group generating process will be described mainly.

Figure 11:
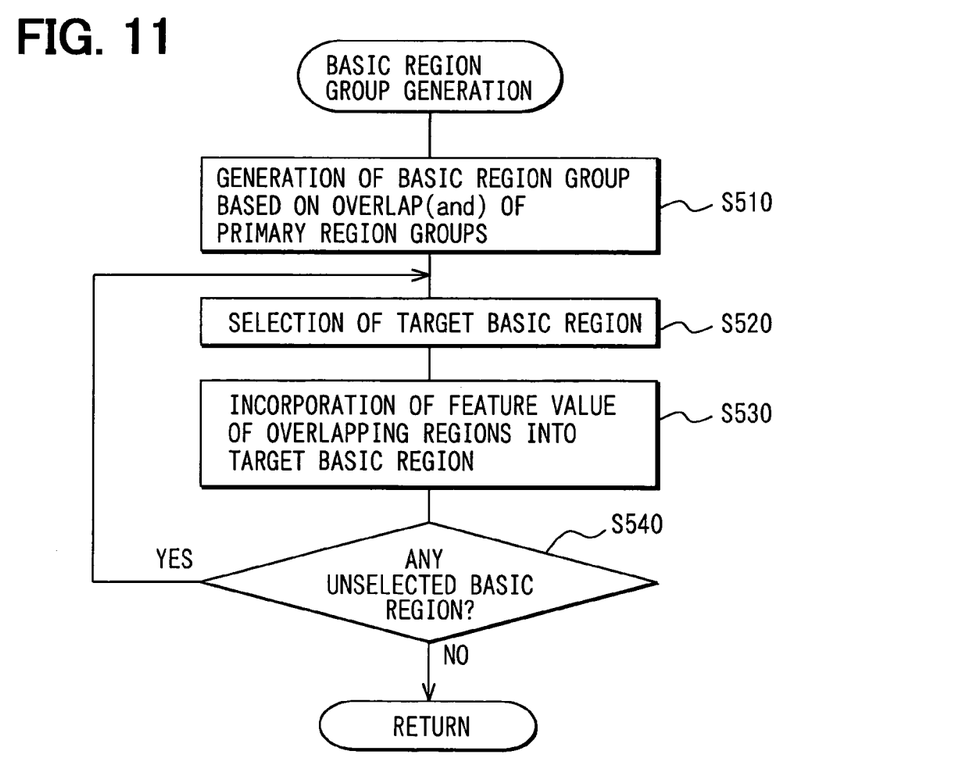
FIG. 11 is a flow chart of a basic region group generating process, according to a second embodiment.

In the present embodiment, at S510, as shown in FIG. 11, the basic region group generating process starts with overlapping a part or a whole of the first to fifth primary region groups to generate the basic region group.

Figure 12:
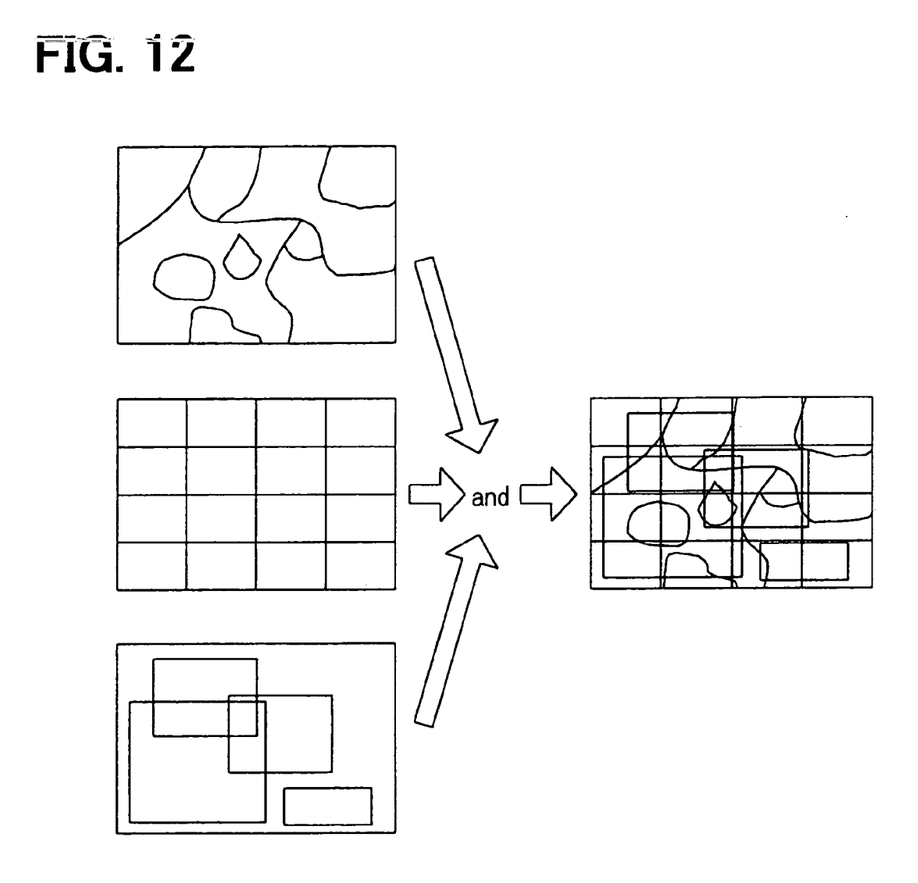
FIG. 12 is a view of generating a basic region group, according to the second embodiment.

Specifically, as shown in FIG. 12, in a case, where primary region groups are overlapped, the target image is divided into delimited regions, which is delimited by corresponding boundaries of each primary region. And all the delimited regions are defined as basic regions, which compose the basic region group.

FIG. 12 shows a case, where the first, the third and the fifth primary region group are overlapped.

At S520, one of the basic regions, which are generated by an above-described method, is selected as the target basic region. In a case, where the target primary region group is used to generate the basic region group, the feature values of overlapping regions in the target primary region group are used as the feature values of the target basic region. In a case, where the target basic region group is not used to generate the basic region group, an average value of each feature value of overlapping regions (the computation target region) in the target primary region group is used as the feature value of the target basic region.

At S540, it is determined if any basic regions remains without being selected as a target basic region. If there is any basic region that is not selected as a target basic region, processes S520 to 530 are performed on the unselected basic region. If not, this process is finished.

According to the image recognizing process device, which is composed as described in the present embodiment, feature values of corresponding primary regions in the primary region groups, which are used to generate the basic region group, can be incorporated into the feature values of the basic region without any additional calculations. Thus, a process load for incorporating the feature values into the basic region can be significantly reduced.

Additional advantages and modifications will readily occur to those skilled in the art. The invention in its broader terms is therefore not limited to the specific details, representative apparatus, and illustrative examples shown and described.

What is claimed is:

1. A region dividing method of a target image, the region dividing method comprising: using a computer to perform the steps of:
    generating a plurality of primary region groups, wherein
        each primary region group includes a plurality of primary regions, which are produced by dividing the target image in such a manner that each primary region of the primary region group is characterized by a measured value of at least one common corresponding feature value, wherein the at least one common corresponding feature value is common to the plurality of primary regions of the primary region group;
    generating a single basic region group that includes a plurality of basic regions, which are produced by dividing the target image, wherein
        each basic region has the measured value of the at least one corresponding feature value of each overlapping one of the plurality of primary regions of each primary region group, which overlaps with the basic region, so that each basic region has the measured values of the feature values of the overlapping primary regions of the plurality of primary region groups, which overlap with the basic region; and
    integrating similar adjacent ones of the plurality of basic regions into a corresponding integrated region, wherein
        a similarity of the similar adjacent ones of the plurality of basic regions satisfies a predetermined similarity with respect to the measured values of the feature values of the similar adjacent ones of the plurality of basic regions.

2. A region dividing device of a target image, the region dividing device comprising:
    a region dividing means for generating a plurality of primary region groups, wherein
        each primary region group includes a plurality of primary regions, which are produced by dividing the target image in such a manner that each primary region of the primary region group is characterized by a measured value of at least one common corresponding feature value, wherein the at least one common corresponding feature value is common to the plurality of primary regions of the primary region group;
    a basic region group generating means for generating a single basic region group that includes a plurality of basic regions, which are produced by dividing the target image, wherein
        each basic region has the measured value of the at least one corresponding feature value of each overlapping one of the plurality of primary regions of each primary region group, which overlaps with the basic region, so that each basic region has the measured values of the feature values of the overlapping primary regions of the plurality of primary region groups, which overlap with the basic region; and
    a region integrating means for integrating similar adjacent ones of the plurality of basic regions into a corresponding integrated region, wherein
        a similarity of the similar adjacent ones of the plurality of basic regions satisfies a predetermined similarity with respect to the measured values of the feature values of the similar adjacent ones of the plurality of basic regions.

3. The region dividing device according to claim 2, wherein
    a measured value of at least one feature value, which is derived from the target image, is used by the region dividing means as the measured value of at least one of the at least one corresponding feature value of at least one of the plurality of primary regions of the plurality of primary region groups.

4. The region dividing device according to claim 2, wherein a measured value of at least one characteristic sensor variable, which is derived through at least one sensor that senses at least one physical quantity of each of a plurality of unit areas produced by dividing the target image, is used by the region dividing means as the measured value of at least one of the at least one corresponding feature value of at least one of the plurality of primary regions of the plurality of primary region groups.

5. The region dividing device according to claim 2, wherein the plurality of basic regions generated by the basic region group generating means is a plurality of regions, each of which is delimited by corresponding one or more of boundaries of the plurality of primary regions of the plurality of primary region groups when the plurality of primary region groups is overlapped one over the other by the basic region group generating means.

6. The region dividing device according to claim 2, wherein the plurality of basic regions, which are generated by the basic region group generating means, is the plurality of primary regions of a first one of the plurality of primary region groups.

7. The region dividing device according to claim 6, wherein:
the basic region group generating means selects one of the plurality of basic regions as a target basic region; and
when two or more of the plurality of primary regions of a second one of the plurality of primary region groups overlap with the target basic region, the basic region group generating means defines each of the two or more of the plurality of primary regions of the second one of the plurality of primary region groups as a computation target region, wherein
the computation target region is used to compute a reference value, which is obtained based on the measured values of a corresponding one of the at least one feature value of the two or more of the plurality of primary regions of the second one of the plurality of primary region groups, and is incorporated into the target basic region.

8. The region dividing device according to claim 6, wherein:
the basic region group generating means selects one of the plurality of basic regions as a target basic region;
when each of two or more of the plurality of primary regions of a second one of the plurality of primary region groups, which overlaps with the target basic region, satisfies a predetermined computation condition, the basic region group generating means defines each of the two or more of the plurality of primary regions of the second one of the plurality of primary region groups as a computation target region, wherein
the computation target region is used to compute a reference value, which is obtained based on the measured values of a corresponding one of the at least one feature value of the two or more of the plurality of primary regions of the second one of the plurality of primary region groups, and is incorporated into the target basic region; and
the predetermined computation condition is satisfied by each of the two or more of the plurality of primary regions of the second one of the plurality of primary region groups when at least one of the following conditions is satisfied:

a distance between a center of the target basic region and a center of each of the two or more of the plurality of primary regions of the second one of the plurality of primary region groups satisfies a predetermined distance condition; and an overlapping area between the target basic region and each of the two or more of the plurality of primary regions of the second one of the plurality of primary region groups satisfies a predetermined area condition.

9. The region dividing device, according to claim 7, wherein
the reference value is an average value of the measured values of the corresponding one of the at least one feature value of the computation target regions.

10. The region dividing device, according to claim 8, wherein
the reference value is a weighted average value of the measured values of the corresponding one of the at least one feature value of the computation target regions.

11. The region dividing device, according to claim 10, wherein
the basic region group generating means changes a weight of each of the measured values of the corresponding one of the at least one feature value of the computation target regions according to at least one of the distance between the center of the target basic region and the center of each of the computation target regions, and the overlapping area between the target basic region and each of the computation target regions.

12. The region dividing device, according to claim 2, wherein
the region integrating means uses a weighted distance between the similar adjacent basic regions on a multi-dimensional characteristic space, which is formed based on the feature values of the basic regions, as the similarity of the similar adjacent basic regions.

13. The region dividing device, according to claim 12, further comprising
a weight information setting means, which analyzes a whole of the target image to extract general properties of the target image, wherein:
the weight information setting means changes a weight of each of the feature values, which are used to compute the weighted distance between the similar adjacent basic regions on the multi-dimensional characteristic space, according to the general properties of the target image; and
the region integrating means uses the weight of each of the feature values, which are used to compute the weighted distance between the similar adjacent basic regions on the multi-dimensional characteristic space.

14. The region dividing device, according to claim 13, wherein the weight information setting means uses at least one of luminosity and complexity of the target image as at least one of the general properties of the target image.

15. An image recognizing process device comprising:
a region extracting means for extracting a region, wherein the region extracting means includes the region dividing device according to claim 2; and
a recognizing means for recognizing each target object, wherein
each target object is described by each extracted region, which is extracted by the region extracting means.

16. A computer readable storage medium comprising instructions being executed by a computer, the instructions implementing a region dividing method of a target image and including:

generating a plurality of primary region groups, wherein
each primary region group includes a plurality of primary regions, which are produced by dividing the target image in such a manner that each primary region of the primary region group is characterized by a measured value of at least one common corresponding feature value, wherein the at least one common corresponding feature value is common to the plurality of primary regions of the primary region group;

generating a single basic region group that includes a plurality of basic regions, which are produced by dividing the target image, wherein
each basic region has the measured value of the at least one corresponding feature value of each overlapping one of the plurality of primary regions of each primary region group, which overlaps with the basic region, so that each basic region has the measured values of the feature values of the overlapping primary regions of the plurality of primary region groups, which overlap with the basic region; and integrating similar adjacent ones of the plurality of basic regions into a corresponding integrated region, wherein
a similarity of the similar adjacent ones of the plurality of basic regions satisfies a predetermined similarity with respect to the measured values of the feature values of the similar adjacent ones of the plurality of basic regions.

* * * * *